(12) United States Patent
Qian et al.

(10) Patent No.: US 7,306,382 B2
(45) Date of Patent: Dec. 11, 2007

(54) MECHANICAL SPLICE OPTICAL FIBER CONNECTOR

(75) Inventors: Charles X. W. Qian, Gilbert, AZ (US); Katherine X. Liu, Tucson, AZ (US)

(73) Assignee: All Optronics, Inc., Tucson, AZ (US)

( * ) Notice: Subject to any disclaimer, the term of this patent is extended or adjusted under 35 U.S.C. 154(b) by 22 days.

(21) Appl. No.: 11/329,413

(22) Filed: Jan. 9, 2006

(65) Prior Publication Data

US 2007/0160332 A1    Jul. 12, 2007

(51) Int. Cl.
*G02B 6/255*    (2006.01)

(52) U.S. Cl. .......................................... 385/95; 385/99

(58) Field of Classification Search ................ 385/55, 385/95–99; 65/501
See application file for complete search history.

(56) References Cited

U.S. PATENT DOCUMENTS

| | | | | |
|---|---|---|---|---|
| 5,076,657 A | * | 12/1991 | Toya et al. | 385/96 |
| 5,315,682 A | * | 5/1994 | Daguet et al. | 385/95 |
| 5,963,699 A | * | 10/1999 | Tanaka et al. | 385/97 |
| 6,338,579 B1 | * | 1/2002 | Winiarski | 385/99 |
| 6,773,167 B2 | * | 8/2004 | Scanzillo | 385/55 |

* cited by examiner

*Primary Examiner*—Kevin S. Wood

(57) ABSTRACT

An fiber optic splice having substantially enhanced reliability and broadened operating temperature range uses a light-cured index matching fluid to splice the facing ends of the optical fibers in between two metallic tubes forming a leak-tight, thermally insulating, and mechanically robust outer package.

20 Claims, 3 Drawing Sheets

(400)

(400)

(500)

(600)

MECHANICAL SPLICE OPTICAL FIBER CONNECTOR

GOVERNMENT SUPPORT

This invention was made with Government support under contract No. N68335-04-C-0140 awarded by Naval Air Warfare Center AD. The Government may have certain rights in the invention.

FIELD OF THE INVENTION

The present invention relates generally to the field of optical fiber communication and more particularly to the reconstruction of an optical fiber cable.

BACKGROUND ART

In the past decade, applications involving optical fiber based communication systems are becoming more practical and are gradually replacing copper based systems. A common task required by these applications is to repair damaged fiber optic cables. There are two prior art technologies that are used to repair fiber-optic cables and the most relevant patents to this invention appear to be the one by Thomas Scanzillo, Aug. 10, 2004, U.S. Pat. No. 6,773,167 and by Toshiyuki Tanaka, Oct. 5, 1999, U.S. Pat. No. 5,963,699. These patents are thereby included herein by way of reference.

A typical prior art mechanical fusion spliced fiber optic cable is illustrated in FIG. 1. The splice consists of an input optical fiber 110 with a protective coating 120, and an output optical fiber 115 with a protective coating 125. The optical fibers are joined at their interface 130 using an automated apparatus following precision alignment and discharge induced fusion splicing process. In order to protect the splicing region, a rigid rod 150 is used and typically the splice and the rigid rod are both enclosed in a heat shrinking enclosure 140.

A typical prior art mechanical fiber-optic splice is illustrated in FIG. 2. The splice consists of an input optical fiber 210 with a protective coating 220, an output optical fiber 215 with a protective coating 225, a capillary glass tube 250 with a precision through channel, placed in side of a protective outer tube 240 and with protective end caps 260 and 265. Typically the input and output fibers are placed inside of the glass capillary, an index matching fluid 230 is used to form an air free contact. For certain splices, there is an added small perpendicular channel in the capillary tube 255. To aid the fiber insertion into the glass capillary tube, two ends of the capillary tube are normally tapered to form interfacing cones. The inner diameter of the capillary tube is made substantially close to the outer diameter of the optical fiber with typical tolerances within one micrometer for a single-mode fiber splice, and a few micrometers for a multimode fiber splice. The index matching fluid is transparent and has a refractive index very close to that of the core of the optical fiber. Frequently, the optical fiber cable-splice interfaces are further protected by flexible boots 270 and 275. The prior art fiber splice is often protected with a plastic outer package (not shown) for mechanical stability.

A related prior art fiber optic cable is illustrated in FIG. 3. The cable consists of coating protected optical fiber 310, loose buffer tube 320, cable strengthening fibers 380 and outer jacket 390. These cables are designed for reliable operation in challenging environments.

The prior art approaches have several areas for improvements. For example, the plastic protective outer package has a very limited range of operating temperature. Furthermore, in avionics applications, a fast temperature-cycled environment requires additional packaging considerations to ensure stable and reliable operations. Furthermore, in order to splice fiber optic cable such as the one illustrated in FIG. 3, one must have structure improvements such that the mechanical and chemical resistance properties of the cable restored. There is a need, therefore, to make improvements to these prior arts, so that highly reliable fiber-optic splices and reconstructed fiber-optic cables can be realized.

SUMMARY OF THE INVENTION

The present invention discloses an apparatus and a method for obtaining fiber-optic splice and fiber-optic cable reconstruction that provides substantially enhanced reliability in a temperature cycled environment. This apparatus and method can be applied to applications in many areas such as avionics and automobile and defense related instrumentation. Key steps of the method include a) using light-cured index matching fluid to splice the optical fiber, b) restoring mechanical strength of the fiber optic cable by crimping cable strengthening fibers in between two metallic tubes; and c) forming a leak-tight, thermally insulating, and mechanically robust outer package.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE INVENTION

The present invention discloses a new method and an apparatus to obtain a highly reliable mechanically reconstructed fiber-optic cable. The new method departs from the prior art practice of directly splicing fiber-optic cables. The basic concept is to introduce a leak-tight, thermally shielded, and mechanically robust outer package. In addition, light-cured index matching fluid is used to permanently fix the optical fibers to the glass capillary. The new approach provides a highly reliable reconstructed fiber-optic cable for hash environment and rough handling.

Figure 1:
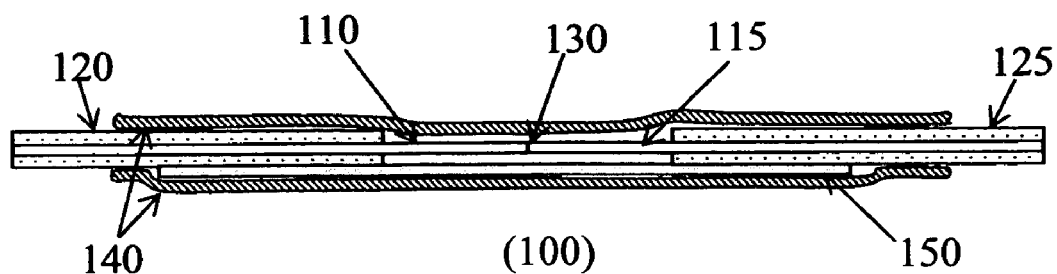
FIG. 1 shows the structure of a prior art fusion spliced fiber-optic splice.
Figure 2:
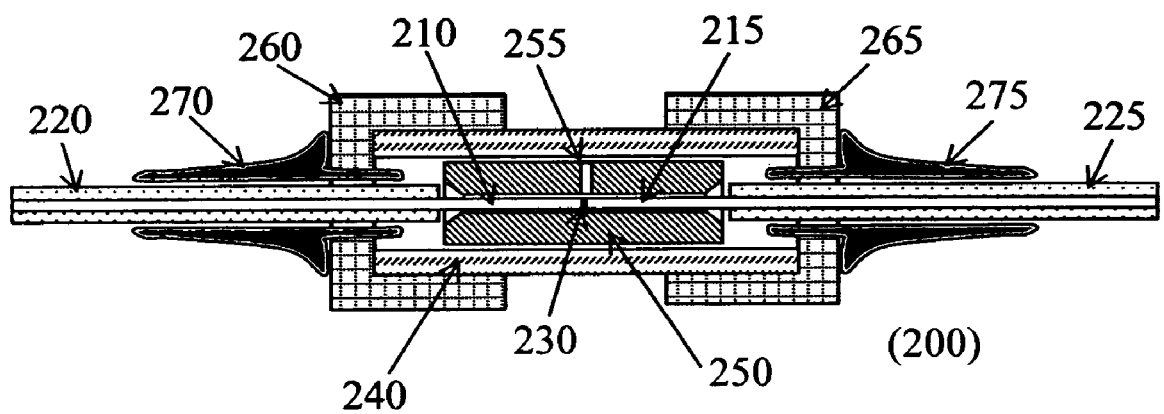
FIG. 2 displays the structure of a prior art mechanical fiber-optic splice.
Figure 3:
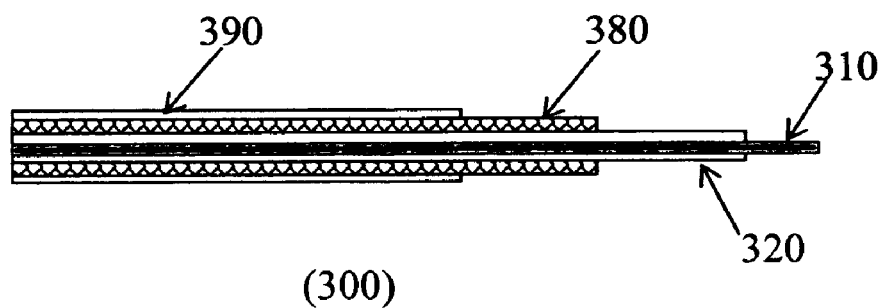
FIG. 3 illustrates the cross sectional view of a high quality prior art fiber-optic cable.
Figure 4:
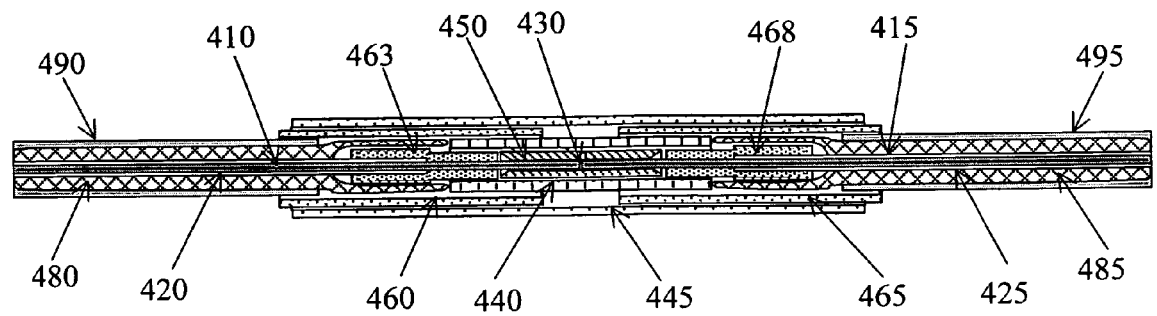
FIG. 4 depicts the cross sectional view of an improved fiber-optic splice incorporating a structure for reconstructed cable.

The first preferred embodiment of the present invention 400 is illustrated in FIG. 4. The core of a reconstructed fiber-optic cable consists of an input optical fiber 410 with an outer protective tube 420, an output optical fiber 415 with an outer protective tube 425, and a glass capillary tube 450 with a precision capillary channel, and two cable-splice bridging flanges 463 and 468. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid is introduced inside of the capillary tube between the optical fiber ends to be spliced, and cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 480 are crimped between the cable-splice bridging flange 463 and an outer tube 460. Similarly the output fiber-optic cable strengthening fibers 485 are crimped in between a bridging flange 468 and its outer tube 465. The cable mechanical property is restored by crimping an outer tube 445 with both input tube 460 and output tube 465, at respective locations.

Figure 5:
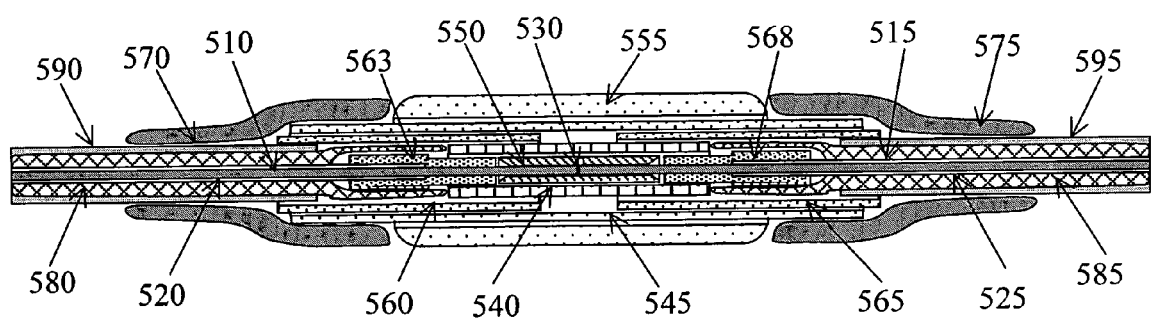
FIG. 5 shows the cross sectional view of an improved fiber-optic splice incorporating a structure for reconstructed cable and further incorporating thermal and mechanical stress reduction elements.

The second preferred embodiment of the present invention 500 is illustrated in FIG. 5. The core of a reconstructed fiber-optic cable consists of an input optical fiber 510 with an outer protective tube 520, an output optical fiber 515 with an outer protective tube 525, and a glass capillary tube 550 with a precision capillary channel, and two cable-splice bridging flanges 563 and 568. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid is introduced inside of the capillary tube between the optical fiber ends to be spliced, and cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 580 are crimped between the cable-splice bridging flange 563 and an outer tube 560. Similarly the output fiber-optic cable strengthening fibers 585 are crimped in between a bridging flange 568 and its outer tube 565. The cable mechanical property is restored by crimping an outer tube 545 with both input tube 560 and output tube 565, at respective locations. In order to improve thermal and mechanical properties of the splice, a thermal insulating tube 555 is placed outside of the splice core whereas two flexible boots 570 and 575 are used to protect the cable-splice interface regions.

Figure 6:
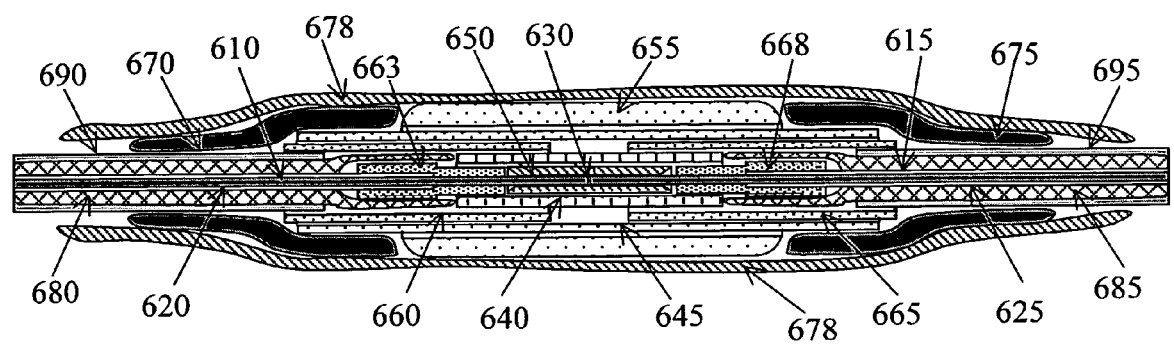
FIG. 6 displays the cross sectional view of an improved fiber-optic splice incorporating a structure for reconstructed cable and further incorporating thermal and mechanical and environmental stress reduction elements.

The third preferred embodiment of the present invention 600 is illustrated in FIG. 6. The core of a reconstructed fiber-optic cable consists of an input optical fiber 610 with an outer protective tube 620, an output optical fiber 615 with an outer protective tube 625, and a glass capillary tube 650 with a precision capillary channel, and two cable-splice bridging flanges 663 and 668. Typically, the ends of the optical fibers are stripped and cleaved according to splicing specifications. The ends are then inserted into the capillary tube. To aid the splicing process, the ends of the capillary tube are tapered to allow for the ease of the insertion of the optical fibers and to accommodate the loose tubes outside of the optical fiber. Light-cured index matching fluid is introduced inside of the capillary tube between the optical fiber ends to be spliced, and cured once a desired insertion loss target is achieved. Typically the inner diameter of the capillary tube is very close to the outer diameter of the optical fiber. For single mode optical fibers, the capillary inner diameter is within one micrometer of the fiber diameter, whereas for multimode fibers it is within a few micrometers. In order to restore mechanical strength of the fiber-optic cable, the input cable strengthening fibers 680 are crimped between the cable-splice bridging flange 663 and an outer tube 660. Similarly the output fiber-optic cable strengthening fibers 685 are crimped in between a bridging flange 668 and its outer tube 665. The cable mechanical property is restored by crimping an outer tube 645 with both input tube 660 and output tube 665, at respective locations. In order to improve thermal and mechanical properties of the splice, a thermal insulating tube 655 is placed outside of the splice core whereas two flexible boots 670 and 675 are used to protect the cable-splice interface regions. The splice is further protected by a heat shrinking outer tube 678.

In the disclosed preferred embodiments outlined above, typically, the Outer package tubes related to crimping (445, 460, 463, 465, 468, 545, 560, 563, 565, 568, 645, 660, 663, 665, and 668) are metallic and can be made with low thermal expansion alloys such as Invar which is a commercially available alloy formed primarily of iron and nickel, and Kovar which is a commercially available alloy formed primarily of nickel, cobalt and iron. The flexible boots (570, 575, 670, 675) are made of rubber materials that can withstand extreme temperature conditions (from −60 to 150° C.). The insulating layer (555 and 655) can be made with materials such as insulation fiberglass or Teflon fibers.

Figure 7:
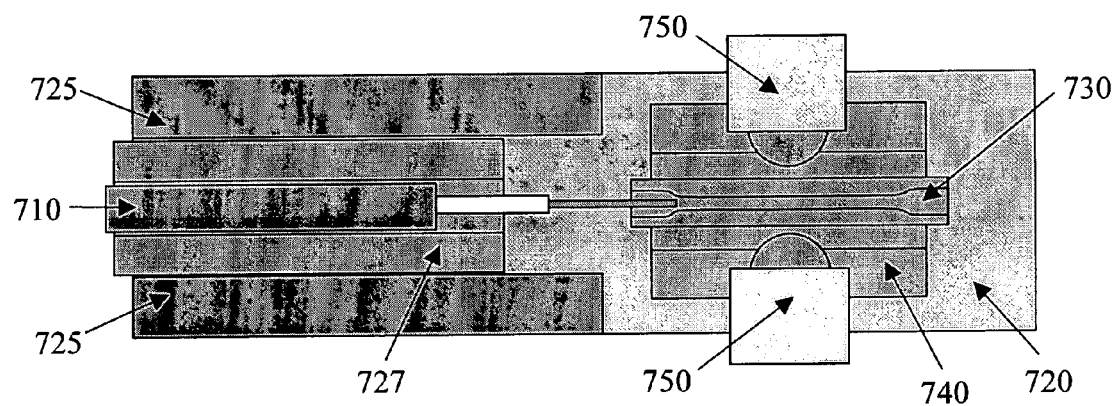
FIG. 7 illustrates an improved splice fixture consisting of base plate, V-grooved fiber cable guide, guide for glass capillary tube, and UV LED light source for curing the index-matching fluid.

The forth preferred embodiment of the present invention is illustrated in FIG. 7. The alignment fixture of the fiber optic splice consists of a base plate 720, V-grooved guides for optical fiber cables 727, for glass capillary 740, and UV-LED sources. In a typical operation, optical fiber ends are stripped and cleaved in accordance to operating specification. The optical fibers are then attached to the V-grooved guide and pushed towards the glass capillary (which is also fixed to a v-grooved guide). The light-curing index matching fluid is then applied between the mating ends of the optical fibers. Once the optical fibers are brought together and certain insertion loss target is achieved, UV-LED will be powered and the splice is cured. Typical index matching liquids are optical adhesives such as NOA6I from Norland, OG142-13 from Epotek, and UV15 from Master Bond.

It will be apparent to those with ordinary skill of the art that many variations and modifications can be made to the method and apparatus for splicing fiber-optic cables disclosed herein without departing form the spirit and scope of the present invention. It is therefore intended that the present invention cover the modifications and variations of this invention provided that they come within the scope of the appended claims and their equivalents.

The invention claimed is:

1. An fiber optic splice comprising:
   at least an input and an output optical fiber cable;
   at least one capillary tube enclosing facing ends of the optical fibers;
   a light-cured index matching fluid inside the capillary tube fixing the facing ends of the optical fibers to the capillary tube;
   first and second metallic crimping tubes surrounding the optical fiber cables and the capillary tube in part; and
   a third metallic crimping tube surrounding the first and second metallic crimping tubes in part.

2. The fiber optic splice recited in claim 1 wherein the input and output optical fiber cables are single mode optical fiber cables.

3. The fiber optic splice recited in claim 1 wherein the input and output optical fiber cables are multimode optical fiber cables.

4. The fiber optic splice recited in claim 1 wherein input and output optical fiber cables each have a fiber core diameter of 1 to 500 µm.

5. The fiber optic splice recited in claim 1 wherein the input and output optical fiber cables each have a fiber cladding diameter of 5 to 1000 µm.

6. The fiber optic splice recited in claim 1 wherein the input and output optical fiber cables each have cable strengthening fibers placed outside of the optical fibers.

7. The fiber optic splice recited in claim 6 wherein the input and output optical fiber cables each have a cable outer jacket enclosing the optical fiber and strengthening fibers.

8. The fiber optic splice recited in claim 1 wherein the capillary tube is made of fused silica.

9. The fiber optic splice recited claim 1 wherein the capillary tube is made of glass material.

10. The fiber optic splice recited in claim 1 wherein the metallic tubes are made of a low thermal expansion alloy formed of nickel, cobalt and iron.

11. The fiber optic splice recited in claim 1 wherein the metallic tubes are made of a low thermal expansion alloy formed of iron and nickel.

12. An fiber optic splice comprising:
    at least an input and an output optical fiber cable;
    at least one capillary tube enclosing facing ends of the optical fibers;
    a light-cured index matching fluid inside the capillary tube fixing the facing ends of the optical fibers to the capillary tube;
    first and second metallic crimping tubes surrounding the optical fiber cables and the capillary tube in part;
    a third metallic crimping tube surrounding the first and second metallic crimping tubes in part;
    at least one thermally insulating tube surrounding the capillary tube;
    and
    at least two flexible boots surrounding the optical fiber cables.

13. The fiber optic splice recited in claim 12 wherein the input and output optical fiber cables are single mode optical fiber cables.

14. The fiber optic splice recited in claim 12 wherein the input and output optical fiber cables are multimode optical fiber cables.

15. The fiber optic splice recited in claim 12 wherein the input and output optical fiber cables each have a fiber core diameter of 1 to 500 µm.

16. The fiber optic splice recited in claim 12 wherein the input and output optical fiber cables each have fiber cladding diameter of 5 to 1000 µm.

17. The fiber optic splice recited in claim 12 wherein the input and output optical fiber cables each have cable strengthening fibers placed outside of the optical fibers.

18. The fiber optic splice recited in claim 12 wherein the input and output optical fiber cables each have a cable outer jacket enclosing the said optical fiber and strengthening fibers.

19. The fiber optic splice recited in claim 12 wherein the capillary tube is made of fused silica.

20. The fiber optic splice recited in claim 12 wherein the capillary tube is made of glass material.

* * * * *